United States Patent Office 3,366,602
Patented Jan. 30, 1968

3,366,602
EPOXY COMPOUND-HARDENER
COMPOSITIONS OF MATTER
Israel J. Dissen, Chicago, Ill., assignor to Velsicol Chemical Corporation, a corporation of Delaware
No Drawing. Filed May 5, 1965, Ser. No. 453,506
14 Claims. (Cl. 260—47)

This invention relates to new chemical compositions of matter and to a method for their preparation. More specifically, this invention relates to new chemical compounds of the general formula

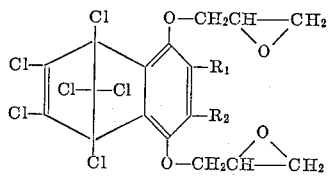

wherein $R_1$ and $R_2$ are independently selected from the group consisting of hydrogen, halogen, phenyl, and lower aliphatic radicals, and to resinous compositions prepared therefrom.

One method for preparing the new chemical compounds of this invention comprises reacting epichlorohydrin and a 5,8-dihydroxy-6,7-$R_1R_2$-1,2,3,4,9,9-hexachloro-1,4-dihydro-1,4-methanonaphthalene such as above described in U.S. Patent 2,584,140, granted February 5, 1952. These naphthalene reactants can be obtained by the rearrangement of compounds of the Formula I below.

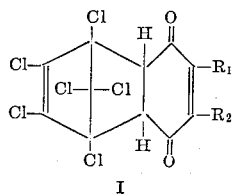

I

However, a distinctive feature of the present invention is the discovery that epichlorohydrin unexpectedly can be reacted directly with compounds of the Formula I to give the new compounds of this invention, without the need for first rearranging the compound I and isolating the resulting dihydroxy compound. In the process of this invention, epichlorohydrin and compounds of the Formula I are reacted in the presence of a metal base.

The compounds of the Formula I used as starting materials in the method of this invention can themselves be obtained by the Diels-Alder addition of hexachlorocyclopentadiene and the appropriate 2,3-$R_1R_2$-1,4-benzoquinones as described, for example, in U.S. Patent 2,584,139, granted February 5, 1952. Suitable benzoquinones to be used for the addition reaction are, therefore, those in which the $R_1$ and $R_2$ are independently selected from the group consisting of hydrogen, halogen, phenyl, and lower aliphatic radicals. By lower aliphatic radicals are meant those which contain up to four carbon atoms. Typical examples of some suitable benzoquinones are therefore benzoquinone itself, toluquinone, phenylbenzoquinone, monobromobenzoquinone, diallylbenzoquinone, 2,3-dichlorobenzoquinone, 2,3-dimethylbenzoquinone, ethylbenzoquinone, isopropylbenzoquinone, butylbenzoquinone, and the like.

The method of this invention comprises reacting epichlorohydrin, a metal base, and a compound of Formula I. The reaction can be promoted by heating the reaction mixture. The exact reaction temperature is not critical, although the reaction proceeds too slowly at very low temperatures. Similarly, too high temperatures are to be avoided in order to prevent decomposition of the reaction mixture. The reaction is generally exothermic so that after an initial heating period, external heat can be withdrawn and the desired reaction temperature can be maintained by adding the metal base in portions as required. External cooling can also be used to reduce the temperature if the spontaneous heating is too great. After all the metal base has been added, external heat can be applied again if required to complete the reaction. While the exact reaction temperature is not critical, temperatures of at least about 60° C. are preferred. Temperatures in the range from about 60° to about 125° C. are most preferred.

The method of this invention can be carried out with a minimum of about two moles of epichlorohydrin and about two moles of metal base for each mole of compound of Formula I employed. In practice, an excess of the epichlorohydrin and the metal base is preferred. When an excess of the epichlorohydrin is used, this material serves as a diluent for the reaction mixture as well as a reactant. However, other inert solvents or diluents can also be used if desired. When additional solvents are not employed, it is preferred to use up to about ten moles and most preferred to use up to about eight moles of epichlorohydrin for each mole of compound of Formula I.

The metal base used in the method of this invention serves as a condensing agent as well as to provide the basic medium for the rearrangement of the quinone of the Formula I to the corresponding hydroquinone in situ. While a minimum of about two moles of metal base can be used for each mole of compound I, it is preferred to use from about 2.2 to about 2.4 moles of metal base for each mole of compound I. Typical of suitable metal bases for the method of this invention are sodium hydroxide, potassium hydroxide, sodium carbonate, potassium carbonate, calcium hydroxide, magnesium hydroxide, and the like. Alkali metal bases such as the sodium or potassium hydroxide are preferred. In order to aid in the solubilization of the metal bases in the reaction mixture, it is also desirable to add small amounts of water to the reaction mixture.

When the reaction is complete, the new compounds of this invention can be isolated and purified by any of the recognized techniques known to the art. For example, the excess epichlorohydrin and water can be stripped from the reaction mixture under reduced pressure. The residue can then be extracted with and crystallized from a suitable solvent such as hexane or methanol.

The manner in which the new compounds of this invention can be obtained is illustrated in the following examples. Examples 2 and 4 demonstrate particularly that the same product can be obtained from the advantageous method of this invention by reacting epichlohohydrin directly with the hexachlorocyclopentadiene-benzoquinone adduct as is obtained by first subjecting the hexachlorocyclopentadiene-benzoquinone adduct to rearrangement and then reacting the rearranged product with epichlorohydrin. All temperatures are in degrees centigrade; and while the reactions are carried out at atmospheric pressure in these examples, it is understood that sub- or super-atmospheric pressures can also be employed.

EXAMPLE 1

*Preparation of the hexachlorocyclopentadiene-benzoquinone adduct*

Hexachlorocyclopentadiene (214 g.) was heated slowly with benzoquinone (82.6 g.) to a temperature of about 130–160° and maintained in that temperature range for about fifteen minutes. The hot reaction mixture was then poured into a chilled beaker and quenched with hexane. Repeated recrystallization from a benzene-hexane mixture gave the desired adduct as a yellow crystalline solid, M.P. 184°.

EXAMPLE 2

*Reaction of the hexachlorocyclopentadiene-benzoquinone adduct and epichlorohydrin*

The adduct (38.1 g.; 0.1 mole) prepared in Example 1, epichlorohydrin (92.5 g.; 1.0 mole) and 0.5 ml. water were mixed in a 300-ml. flask fitted with a stirrer, thermometer, and condenser. The mixture was heated and stirred while pellets of sodium hydroxide were added. When the temperature had reached about 65°, and exothermic reaction was observed. The temperature of the stirred reaction mixture was then maintained at about 60°–70° by the gradual addition of sodium hydroxide pellets until a total of 9.0 g. (0.225 mole) had been added. The excess epichlorohydrin was then stripped off under aspirator vacuum to a pot temperature of 70°. The residue was then extracted by boiling with portions of hexane, and the combined hexane solutions were allowed to cool. The crystals were filtered and dried to give the desired 5,8 - di(2,3-epoxypropoxy)-1,2,3,4,9,9-hexachloro-1,4-dihydro-1,4-methanonaphthalene, M.P. 95–97°.

Analysis for $C_{17}H_{12}Cl_6O_4$: Theory, percent: C, 41.41; H, 2.45; Cl, 43.15; Oxirane oxygen 6.49. Found, percent: C. 41.49; H, 2.77; Cl, 43.35; Oxirane oxygen 6.31.

EXAMPLE 3

*Rearrangement of the hexachlorocyclopentadiene-benzoquinone adduct*

The adduct (2.0 g.) prepared in Example 1 was dissolved in methanol to which 5 drops of pyridine had been added. The mixture was refluxed for about one-half hr. (the solution decolorized in about 10 minutes), and then a few drops of sulfuric acid were added. The solution was evaporated to about one-half volume, whereupon water was added to precipitate a white solid of 5,8 - dihydroxy - 1,2,3,4,9,9-hexachloro-1,4-dihydro-1,4-methanonaphthalene, M.P. 184–186° after recrystallization from methanol.

EXAMPLE 4

*Reaction of the rearranged adduct with epichlorohydrin*

The rearranged adduct (38.1 g.; 0.1 mole) of Example 3, epichlorohydrin (1.0 mole), and 0.5 ml. water were placed in a 3-necked flask equipped with a stirrer, thermometer, and condenser. After an initial heating, pellets of sodium hydroxide (8.2 g. in 6 portions) were added over a period of 1.5 hrs. while the temperature was maintained at 60–65°, with external cooling when necessary to control the exothermic reaction. After all the sodium hydroxide had been added, the mixture was heated at 80° for 20 minutes. The excess epichlorohydrin was then stripped under vacuum at a temperature not greater than 80°. The residue was extracted with hot hexane. The combined extracts were cooled to yield a precipitate of 5,8 - di(2,3-epoxypropoxy)-1,2,3,4,9,9-hexachloro-1,4-dihydro-1,4-methanonaphthalene, M.P. 95–97°.

A wide variety of other new compounds within the scope of this invention can be prepared in the manner detailed in the above examples. Given in the following examples are the reactions with epichlorohydrin (designated as "E" for brevity) of some typical adducts of hexachlorocyclopentadiene (designated as "H" for brevity) and various quinones required to give the named compounds of this invention:

EXAMPLE 5

E+adduct of H and toluquinone=5,8-Di(2,3-epoxypropoxy) - 1,2,3,4,9,9 - hexachloro-6-methyl-1,4-dihydro-1,4-methanonaphthalene.

EXAMPLE 6

E+adduct of H and phenylbenzoquinone=5,8-Di(2,3-epoxypropoxy) - 1,2,3,4,9,9 - hexachloro-6-phenyl-1,4-dihydro-1,4-methanonaphthalene.

EXAMPLE 7

E+adduct of H and monobromobenzoquinone=5,8-Di(2,3 - epoxypropoxy) - 1,2,3,4,9,9-hexachloro-6-bromo-1,4-dihydro-1,4-methanonaphthalene.

EXAMPLE 8

E+adduct of H and 2,3-diallylbenzoquinone=5,8-Di(2,3 - epoxypropoxy) - 1,2,3,4,9,9-hexachloro-6,7-diallyl-1,4-dihydro-1,4-methanonaphthalene.

EXAMPLE 9

E+adduct of H and 2,3-dichlorobenzoquinone=5,8-Di(2,3 - epoxypropoxy) - 1,2,3,4,6,7,9,9-octachloro-1,4-dihydro-1,4-methanonaphthalene.

EXAMPLE 10

E+adduct of H and 2,3-dimethylbenzoquinone=5,8-Di(2,3 - epoxypropoxy) - 1,2,3,4,9,9-hexachloro-6,7-dimethyl-1,4-dihydro-1,4-methanonaphthalene.

EXAMPLE 11

E+adduct of H and ethylbenzoquinone=5,8-Di(2,3-epoxypropoxy) - 1,2,3,4,9,9 - hexachloro-6-ethyl-1,4-dihydro-1,4-methanonaphthalene.

EXAMPLE 12

E+adduct of H and isopropylbenzoquinone=5,8-Di(2,3 - epoxypropoxy) - 1,2,3,4,9,9-hexachloro-6-isopropyl-1,4-dihydro-1,4-methanonaphthalene.

EXAMPLE 13

E+adduct of H and butylbenzoquinone=5,8-Di(2,3-epoxypropoxy) - 1,2,3,4,9,9-hexachloro-6-butyl-1,4-dihydro-1,4-methanonaphthalene.

The new compounds of this invention are useful in that they can be cured with carboxylic acids or anhydrides, polyols, or polyfunctional amines to give valuable synthetic resins. Another aspect of this invention is therefore a curable mixture which comprises a new compound of this invention and a reactive hardener, the reactive hardener being a polyamine, a polyol, a polycarboxylic acid, or a mixture which comprises a polycarboxylic anhydride and a polyol. The new compounds can also be polymerized by ionic catalysts such as mineral acids, metal halide Lewis acids, or strong bases. Further aspects of this invention are also the hard, infusible, self-extinguishing resins which are formed from the curable mixtures, as well as the process for their formation.

As examples of the new curable mixtures of this invention are those comprising a new compound of this invention and a polyfunctional amine. By polyfunctional amine is meant an organic compound which has at least one nitrogen atom and at least two active amino hydrogen atoms which can be on the same or different nitrogen atoms. Typical examples of such suitable polyfunctional amines are aliphatic amines such as ethylamine, isopropylamine, 2-ethylhexylamine, ethanolamine, cyclohexylamine, and beta-alanine; amides such as formamide, acetamide, propionamide, and stearamide; primary aromatic amines such as aniline and alpha-methylbenzylamine; primary heterocyclic amines such as N-aminoethyl morpholine; aliphatic polyamines such as ethylenediamine, diethylenetriamine, propylenediamine, decylenediamine, dimethylurea, and guanidine; aromatic polyamines such as the phenylenediamines, xylenediamine, 3,4-toluenediamine, 1,4-naphthalenediamine, and 3,4-biphenylamine; and heterocyclic polyamines such as piperazine, melamine, and 2,5-dimethylpiperazine.

The polyfunctional amines such as those listed above can be combined with the new compounds in a variety of proportions to give valuable curable mixtures according to this invention. It is preferred, however, that the proportions be such as to provide from about 0.2 to about 4.0 amino hydrogens of the amine for each epoxy group in the new compounds. It is most preferred that the proportions be such as to provide from about 0.5 to about 2.5 amino hydrogens for each epoxy group. When resins are formed from these curable mixtures, temperatures as low as about 20° C. are often satisfactory. Curing at such temperatures will usually require several days, and therefore somewhat higher temperatures can be used advantageously. However, it is preferred that the temperature during the curing process does not exceed about 150° C. In addition, polymerization catalysts of the type known in the art can be used to accelerate the curing process if desired.

As further examples of the new curable mixtures of this invention are those comprising a new compound of this invention and a mixture comprising a polycarboxylic anhydride and a polyol. By a polycarboxylic anhydride is meant a compound containing at least one oxydicarbonyl group, —C(O)—O—(O)C—. Typical of such polycarboxylic anhydrides are compounds such as succinic anhydride, glutaric anhydride, propylsuccinic anhydride, maleic anhydride, chloromaleic anhydride, dichloromaleic anhydride, itaconic anhydride, citraconic anhydride, hexahydrophthalic anhydride, endomethylenetetrahydrophthalic anhydride (Carbic Anhydride), methyl endomethylenetetrahydrophthalic anhydride, tetrahydrophthalic anhydride, tetrachlorophthalic anhydride, hexachloroendomethylenetetrahydrophthalic anhydride (Chlorendic Anhydride), phthalic anhydride, 4-nitrophthalic anhydride, 1,2-naphthalic anhydride, and the like.

The polycarboxylic anhydrides such as those cited above can be combined with the new compounds of this invention and polyols in a variety of proportions to give valuable curable mixtures. It is preferred, however, that the proportions be such as to provide from about 0.33 to about 4.00 carboxy equivalents of the anhydride for each epoxy group in the new compounds. It is most preferred that the proportions be such as to provide from about 0.67 to about 3.0 carboxy equivalents of the anhydride for each epoxy group in the new compounds. When resins are formed from such curable mixtures, somewhat higher temperatures are required than in the use of polyfunctional amines as reactive hardeners. Temperatures of at least about 50° C. are preferred, and temperatures in the range from about 50° to about 250° C. are most preferred. Catalysts of the type known to the art can again be used to promote the curing process if desired.

When polycarboxylic anhydrides are used as the reactive hardener in the curing of the new mixtures of this invention, they are used in combination with polyols. Such polyols comprise polyhydric alcohols and polyhydric phenols. Typical examples of suitable polyhydric alcohols are such compounds as ethylene glycol, diethylene glycol, triethylene glycol, tetraethylene glycol, 1,2-propylene glycol, dipropylene glycol, 1,2-butylene glycol, 2-ethyl-1,3-hexanediol, 2-butyne-1,4-diol, 3-cyclohexane-1,1-dimethanol, 1,1,1-trimethylolpropane, glycerol, trimethylolmethane, pentaerythritol, and the like. Typical examples of some suitable polyhydric phenols are such compounds as resorcinol, catechol, hydroquinone, the dihydroxynaphthalenes, chlorohydroquinone, toluhydroquinone, 4-n-hexylresorcinol, phloroglucinol, pyrogallol, hydroxyhydroquinone, tetrahydroxyquinone, pentahydroxybenzene, dihydroxytoluene, and the like.

When the polyols are used in conjunction with the polycarboxylic anhydrides in preparing valuable curable mixtures according to this invention, they can be used in a variety of molar proportions. However, it is preferred that the proportions be such as to provide up to about 3.0 hydroxyl groups of the polyol for each epoxy group in the new compounds. It is most preferred that the proportions be such as to provide up to about 1.67 hydroxyl groups for each epoxy group in the new compounds.

Curable mixtures according to this invention also comprise a new compound of this invention and a polycarboxylic acid. By a polycarboxylic acid is meant a compound having two or more carboxyl groups to the molecule. Any of the polycarboxylic acids corresponding to the polycarboxylic anhydrides previously cited are typical examples of such suitable compounds. The polycarboxylic acids can be used in a variety of proportions, but it is preferred to use from about 0.3 to about 2.5 carboxyl groups of the acid for each epoxy group in the new compounds. It is most preferred that the proportions be such as to provide from about 0.5 to about 1.25 carboxyl groups of the acid for each epoxy group in the new compounds. When resins are formed from such curable mixtures, temperatures similar to those used for mixtures of the new compounds of this invention, polycarboxylic anhydrides, and polyols can be employed.

Curable mixtures according to this invention also comprise a new compound of this invention and a polyol. Polyols such as those defined previously are suitable. Preferred curable mixtures comprise from about 0.5 to about 2.5 hydroxyl groups of the polyol for each epoxy group in the new compound. Most preferred curable mixtures comprise from about 0.75 to about 1.5 hydroxyl groups of the polyol for each epoxy group in the new compound. When resins are formed from such curable mixtures, temperatures similar to those used for mixtures of the new compounds of this invention, polycarboxylic anhydrides, and polyols can be employed.

The following examples illustrate the manner in which the new curable mixtures of this invention can be polymerized to form the hard, infusible, self-extinguishing resins of this invention. All temperatures are in degree centigrade.

Example 14

A mixture was prepared of 24.4 g. of the 5.8-di(2,3-epoxypropoxy)- 1,2,3,4,9,9-hexachloro-1,4-dihydro - 1,4-methanonaphthalene prepared in Example 2, 14.7 g. of chlorendic anhydride, and 0.9 g. of trimethylolpropane. The mixture was heated and stirred in an oil bath at 120° until a clear solution was obtained. The mixture was then poured into a preheated mold and placed in an oven at 120°. The mixture gelled in 1 hour. It was then post cured for 2 hours at 150° and finally for 16 hours at 180°. The resulting molded resin was found to have a mole) was charged into a tube, which was placed in a flame, it was immediately self-extinguishing.

Example 15

A mixture of 5,8 - di(2,3-epoxypropoxy)-1,2,3,4,9,9-hexachloro-1,4-dihydro-1,4 - methanonaphthalene (4.93 g.; 0.01 mole) and m-phenylene diamine (0.54 g.; 0.005 mole) was charged into a tube, which was placed in a 140° oil bath. The mix was stirred for about a minute to effect solution, whereupon the tube was placed in an oven at 65°. In about 15–20 minutes, the contents of the tube gelled; and the oven temperature was raised to 120° for 0.5 hr. Cooling of the cured mixture gave a tough, solid cast which was self-extinguishing when withdrawn from a free flame.

Example 16

5,8-di(2,3-epoxypropoxy) - 1,2,3,4,9,9 - hexachloro-1,4-dihydro-1,4-methanonaphthalene (4.93 g.; 0.01 mole) was heated to about 135° in an oil bath with Epon 828 (1.13 g.; 0.0028 mole), a commercial condensation product of Bisphenol A and epichlorohydrin. The white paste which was obtained on cooling was charged into a tube with m-phenylene diamine (0.70 g.; 0.0064 mole). The tube was placed in an oil bath at 140°, and the mixture was stirred until homogeneous (about 10 minutes). On cooling, a tough, glossy cast was obtained.

Other hard, infusible, self-extinguishing resins according to this invention can be prepared in a manner similar to that detailed above. The reactants and their proportions for more typical additional examples are listed in tabular form below.

| Ex. No. | Epoxy Compound of Example | Polyfunctional Amine or Polycarboxylic Anhydride | Amount [1] | Polyol | Amount [2] | Curing Temp., deg. |
|---|---|---|---|---|---|---|
| 17 | 7 | Ethylenediamine | 0.2 | | | 150 |
| 18 | 6 | Phthalic anhydride | 0.33 | Ethylene glycol | 0.75 | 125 |
| 19 | 5 | 1,6-Hexanediamine | 4.0 | | | 20 |
| 20 | 9 | Pyromellitic anhydride | 4.00 | Hexane-1,4-diol | 3.00 | 250 |
| 21 | 8 | Diethylenetriamine | 0.5 | | | 100 |
| 22 | 10 | Dodecenyl succinic anhydride | 0.67 | 1,3-propylene glycol | 0.5 | 50 |
| 23 | 13 | m-Xylenediamine | 2.5 | | | 125 |
| 24 | 12 | Hexahydrophthalic anhydride | 3.0 | Polyoxypropylene glycol | 1.67 | 100 |

[1] Expressed as amino hydrogens of the amine or carboxy equivalents of the anhydride per epoxy group of the epoxy compound.
[2] Expressed as hydroxyl groups of the polyol per epoxy group of the epoxy compound.

I claim:
1. A curable mixture comprising an epoxy compound of the general formula wherein $R_1$ and $R_2$ are independently selected from the group consisting of hydrogen, halogen, phenyl, and lower aliphatic radicals; and a reactive epoxy hardener.

2. The mixture of claim 1, wherein the reactive hardener is a polyfunctional amine.

3. The mixture of claim 2, wherein the polyfunctional amine is present in a quantity to provide from about 0.2 to about 4.0 amino hydrogens for each epoxy group in the epoxy compound.

4. The mixture of claim 2, wherein the polyfunctional amine is present in a quantity to provide from about 0.5 to about 2.5 amino hydrogens for each epoxy group in the epoxy compound.

5. The mixture of claim 1, wherein the reactive hardener comprises a polycarboxylic anhydride and a polyol.

6. The mixture of claim 5, wherein the polycarboxylic anhydride is present in a quantity to provide from about 0.33 to about 4.00 carboxy equivalents for each epoxy group of the epoxy compound and the polyol is present in a quantity to provide up to about 3.0 hydroxyl groups for each epoxy group of the epoxy compound.

7. The mixture of claim 5, wherein the polycarboxylic anhydride is present in a quantity to provide from about 0.67 to about 3.0 carboxy equivalents for each epoxy group of the epoxy compound and the polyol is present in a quantity to provide up to about 1.67 hydroxyl groups for each epoxy group in the epoxy compound.

8. A hard, infusible, self-extinguishing resin comprising a polymerized mixture of claim 1.

9. A hard, infusible, self-extinguishing resin comprising a polymerized mixture of claim 2.

10. A hard, infusible, self-extinguishing resin comprising a polymerized mixture of claim 3.

11. A hard, infusible, self-extinguishing resin comprising a polymerized mixture of claim 4.

12. A hard, infusible, self-extinguishing resin comprising a polymerized mixture of claim 5.

13. A hard, infusible, self-extinguishing resin comprising a polymerized mixture of claim 6.

14. A hard, infusible, self-extinguishing resin comprising a polymerized mixture of claim 7.

No references cited.

WILLIAM H. SHORT, *Primary Examiner.*

T. D. KERWIN, *Assistant Examiner.*

UNITED STATES PATENT OFFICE
CERTIFICATE OF CORRECTION

Patent No. 3,366,602                                January 30, 1968

Israel J. Dissen

It is hereby certified that error appears in the above numbered patent requiring correction and that the said Letters Patent should read as corrected below.

Column 6, line 45, strike out "mole) was charged into a tube, which was placed in" and insert instead -- heat distortion temperature of 208°. When placed in --.

Signed and sealed this 8th day of April 1969.

(SEAL)

Attest:

Edward M. Fletcher, Jr.

Attesting Officer

EDWARD J. BRENNER

Commissioner of Patents